United States Patent [19]
Kiss et al.

[11] Patent Number: 4,767,566
[45] Date of Patent: Aug. 30, 1988

[54] PROCESS FOR PRODUCING LUMINOUS MATERIAL BASED ON MANGANESE ACTIVATED CADMIUM BORATE

[75] Inventors: Akos Kiss, Aschaffenburg; Peter Kleinschmit, Hanau; Werner Völker, Bad Vilbel; Günter Halbritter, Schöllkrippen, all of Fed. Rep. of Germany

[73] Assignee: Degussa Aktiengesellschaft, Frankfurt am Main, Fed. Rep. of Germany

[21] Appl. No.: 5,304

[22] Filed: Jan. 20, 1987

Related U.S. Application Data

[63] Continuation of Ser. No. 730,578, May 6, 1985, abandoned.

[30] Foreign Application Priority Data

May 12, 1984 [DE] Fed. Rep. of Germany ....... 3417626

[51] Int. Cl.$^4$ ............................................. C09K 11/64
[52] U.S. Cl. ....................... 252/301.6 F; 252/301.6 R
[58] Field of Search ................... 252/301.6 F, 301.6 R

[56] References Cited

U.S. PATENT DOCUMENTS 3,236,781 2/1966 Veres ............................ 252/301.6 R
3,300,670 1/1967 Veres ............................ 252/301.6 F

OTHER PUBLICATIONS

Römpps, Chemie-Lexikon, pp. 3971–3972.
Zeolite Molecular Sieves, Donald W. Breck, John Wiley & Sons, 1974, pp. 83–87 and 133.
Prospectus: Sodium Aluminium Silicate HAB A40, DeGussa.

Primary Examiner—Jack Cooper
Attorney, Agent, or Firm—Cushman, Darby & Cushman

[57] ABSTRACT

There are prepared luminescent materials based on cadmium borate activated with manganese which is insensitive to impurities, temperature stable, not sensitive to grinding, and stable to ceramic glazes having the composition. In the preparation, the manganese activator is added in the form of a zeolite.

8 Claims, No Drawings

PROCESS FOR PRODUCING LUMINOUS MATERIAL BASED ON MANGANESE ACTIVATED CADMIUM BORATE

This is a continuation of application Ser. No. 730,578, filed May 6, 1985, which was abandoned upon the filing hereof.

BACKGROUND OF THE INVENTION

The invention is directed to luminescent materials based on cadmium borate activated with manganese, as well as a process for producing them.

Luminescent materials are solid substances which are capable of emitting light after absorbing energy (e.g., daylight, ultraviolet light, rontgen rays (X-rays), or corpuscular rays), which emitted light generally exhibits a greater wave length than that of the absorbed ray. The light radiation occurs during the excitation itself and at various lengths of time thereafter, which can be from milliseconds to hours.

Luminescent materials find expanding use, such as, for example, in light engineering to increase the energy yield in mercury lamps, in X-ray diagnostics, or in the coating of television tubes to make visible the modulated electron beam. Besides, they are used as coatings for ceramic products, especially in glazes for ceramic tiles.

Only a few inorganic compounds are capable of luminescence. Generally, the luminescence capability is first acquired through an activation, for example, by building small amounts of ions (activators) foreign to the crystal lattice into the crystal lattice (host lattice) of the inorganic compound (base material). Therefore, in the activator containing luminescent materials, it is a matter of crystallized compounds in which a few cations of the base materials are replaced by foreign cations. The built-in cations with the surrounding band of anions thereby has been conceived as the so-called luminescent centers which are responsible for the characteristic absorptions and emissions.

As base materials for the luminescent materials of significance, above all are salts of the alkaline earths and their side group elements zinc and cadmium as phosphates, silicates, borates, aluminates, and oxides. As activators, there are preferably used the rare earths and heavy metals, such as manganese, lead, tin, or antimony.

The luminescent materials generally must be very pure and have a crystal lattice as free as possible from disturbances since impurities in the starting materials act as quench centers and reduce the luminescent intensity of the luminescent materials. Lattice defects act similarly. The luminescent capability is damaged in the mechanical comminution of the compounds and in the extreme case can be completely destroyed.

The previously known luminescent materials have the further disadvantage that most of them are not temperature stable and disintegrate in many fritted glasses. Therefore, they are not suitable as pigments in glazes for ceramic tiles which require firing temperatures of over 700° to 800° C.

Luminescent materials based on cadmium borates activated with manganese are known. Cadmium oxide (CdO) forms a large number of cadmium borates with boron oxide ($B_2O_3$), which borates upon activation with manganese result in green to red emitting luminescent materials depending on their composition. Only ($2CdO.B_2O_3:Mn$) has found practical use which upon excitation with mercury vapor radiation of 254 nm has an emission band in the orange red region at 626 nm. The luminescent material can be produced from the very pure starting compounds CdO or $CdCO_3$, $H_3BO_3$, and $MnCO_3$ by calcining at 800° C. but is very sensitive to impurities, mechanical comminution, high temperatures, and glass fluxes such as occur in the glazing of ceramic products.

Therefore, it was the problem of the present invention to develop luminescent materials based on manganese activated cadmium borate which can be produced at practically the same light intensity in the red region from commercial starting components having a lesser degree of purity, which are not sensitive to grinding and are as temperature stable and chemically stable to ceramic glazes as the known luminescent materials. Besides, there should be found a process for the production of these luminescent materials.

SUMMARY OF THE INVENTION

This problem was solved according to the invention by providing a luminescent material which consists of (or consists essentially of):

(a) 1 to 80 mole % Cadmium oxide (CdO)
(b) 1 to 50 mole % Boron oxide ($B_2O_3$)
(c) 0.2 to 1.3 mole % Manganese oxide (MnO)
(d) 0 to 10 mole % of an oxide from the group potassium oxide, calcium oxide, magnesium oxide, barium oxide, strontium oxide, nickel oxide, cobalt oxide, chromium oxide, titanium oxide, and/or zirconium oxide, and
(e) 0.1 to 22.5 mole % Sodium oxide ($Na_2O$)
(f) 0.3 to 23.8 mole % Aluminum oxide ($Al_2O_3$)
(g) 0.5 to 47.5 mole % Silica ($SiO_2$)

wherein the $Na_2O$, $Al_2O_3$, and $SiO_2$ are present in the form of zeolite phase.

Preferably, this luminescent material contains:
10 to 60 mole % Cadmium oxide (CdO)
10 to 45 mole % Boron oxide ($B_2O_3$)
0.3 to 1.0 mole % Manganese oxide (MnO)
0 to 10 mole % of an oxide from the group $K_2O$, CaO, MgO, BaO, SrO, NiO, CoO, $Cr_2O_3$, and $TiO_2$ and/or $ZrO_2$ and
1.5 to 19.7 mole % Sodium oxide ($Na_2O$)
2.5 to 20 mole % Aluminum Oxide ($Al_2O_3$)
5 to 40 mole % Silica ($SiO_2$)
in the form of a zeolite phase.

These luminescent materials can be produced from starting components which are not of high purity, are essentially insensitive to grinding, and are resistant to most ceramic glazes.

Especially insensitive and intense luminescent materials are obtained in the following range:
24 to 28 mole % Cadmium oxide (CdO)
25 to 29 mole % Boron oxide ($B_2O_3$)
0.4 to 0.8 mole % Manganese oxide (MnO)
0 to 10 mole % of an additional oxide ($K_2O$, CaO, MgO, BaO, SrO, NiO, CoO, $Cr_2O_3$, $TiO_2$, $ZrO_2$)
and
9.4 to 12.7 mole % Sodium oxide ($Na_2O$)
10.2 to 13.1 mole % Aluminum oxide ($Al_2O_3$)
20.4 to 26.2 mole % Silica ($SiO_2$)
in the form of a zeolite phase.

As additional oxide there is preferably employed 2 to 10 mole % of calcium oxide, magnesium oxide, or zirconium oxide.

The luminescent materials of the invention have an excitation maximum at 290 nm and an emission maximum at 655 nm [$\Delta\lambda=2$ nm] in the red region with a width at half maximum intensity of around 22 nm. The addition of further oxides displaces the wave length of the emitted light to a certain extent: CaO and MgO, for example, cause a displacement into the dark, red region, $ZrO_2$ into the rose region.

The inclusion of a zeolite, preferably of Type A, as a luminescent component has the further advantage that the activator manganese is supplied with the help of the zeolite in its function as ion exchanger and through this can be distributed very homogeneously in the luminescent material.

For the production of the luminescent materials of the invention commercial starting materials for the production of cadmium borate are well mixed in comminuted condition in the form of oxides or compounds which are converted to the oxide in heating, such as, for example, cadmium oxide or carbonate and boric acid, in the corresponding molar ratios together with a manganese loaded zeolite, preferably Type A, and in a given case also an oxide of the group consisting of potassium oxide, calcium oxide, magnesium oxide, barium oxide, strontium oxide, nickel oxide, cobalt oxide, chromium oxide, titanium oxide, and zirconium oxide, then pressed lightly and calcined in a solid body reaction at 650° to 900° C. for 0.5 to 6 hours in the air. The calcined product can be subsequently comminuted by grinding without reducing the luminescent intensity thereby.

Preferably, calcining is carried out at 700° to 800° C. for 1 to 4 hours.

The composition can consist of or consist essentially of the stated materials.

DETAILED DESCRIPTION

To produce the manganese loaded zeolite, for example, 200 grams of a zeolite Type A (HAB 40 Degussa) was stirred with 5.9 grams of manganese chloride ($MnCl_2.2H_2O$) in 1 liter of water at 80° C. for about 4 hours, filtered off, washed, and dried at 120° C.

For example, 500 grams of cadmium oxide (CdO), 500 grams of boric acid ($H_3BO_3$), and 500 grams of a manganese loaded zeolite (Type A) were comminuted and dry mixed for 15 minutes in a mixer, then lightly compacted by pressure in a ceramic crucible and placed in a chamber furnace which was heated up at 400° C. per hour. Calcining was carried out at 760° C. in a time of 2 hours. The luminescent material thus produced did not lose noticeable luminescent strength upon comminution, was temperature stable, and was resistant to most ceramic glazes.

The following luminescent materials, for example, were produced according to this process.

| CdO [Mole %] | $B_2O_3$ [Mole %] | MnO [Mole %] | $Na_2O$ [Mole %] | $Al_2O_3$ [Mole %] | $SiO_2$ [Mole %] | $Me_xO_y$ [Mole %] |
|---|---|---|---|---|---|---|
| 26.0 | 27.0 | 0.6 | 10.9 | 11.5 | 24.0 | |
| 78.2 | 19.4 | 0.3 | 0.3 | 0.6 | 1.2 | |
| 60.1 | 28.3 | 0.7 | 2.2 | 2.9 | 5.8 | |
| 19.5 | 48.1 | 1.1 | 7.0 | 8.1 | 16.2 | |
| 1.3 | 43.9 | 1.2 | 12.5 | 13.7 | 27.4 | |
| 24.9 | 1.5 | 1.0 | 17.4 | 18.4 | 36.8 | |
| 33.9 | 32.1 | 0.8 | 6.9 | 7.7 | 15.4 | 3.2 CaO |
| 29.2 | 29.6 | 0.9 | 7.3 | 8.2 | 16.4 | 8.4 CaO |
| 26.4 | 33.8 | 1.0 | 7.0 | 8.0 | 16.0 | 7.8 MgO |
| 26.3 | 28.5 | 1.2 | 7.8 | 9.0 | 18.0 | 9.2 $ZrO_2$ |
| 26.1 | 28.4 | 0.7 | 10.1 | 10.8 | 21.6 | 2.3 $ZrO_2$ |
| 24.8 | 25.3 | 0.8 | 12.8 | 12.1 | 24.2 | |
| 23.8 | 25.2 | 0.8 | 17.8 | 10.8 | 21.6 | |

What is claimed is:

1. A process for producing a luminescent material containing manganese activated cadmium borate comprising the steps of:
   (1) forming a mixture in comminuted form corresponding to the formulation of
      (a) 1 to 80 mole % cadmium oxide (CdO),
      (b) 1 to 50 mole % boron oxide ($B_2O_3$),
      (c) 0.2 to 1.3 mole % manganese oxide (MnO),
      (d) 0 to 10 mole % of an oxide selected from the group potassium oxide, calcium oxide, magnesium oxide, barium oxide, strontium oxide, nickel oxide, cobalt oxide, chromium oxide, titanium oxide, and zirconium oxide,
      (e) 0.1 to 22.5 mole % sodium oxide ($Na_2O$),
      (f) 0.3 to 23.8 mole % aluminum oxide ($Al_2O_3$),
      (g) 0.5 to 47.5 mole % silica ($SiO_2$); wherein materials (a), (b) and (d) are oxides or compounds which are converted into oxides under the calcining conditions employed in step (3) and materials (c), (e), (f) and (g) are in the form of a manganese loaded zeolite-A;
   (2) lightly pressing the mixture of step (1); and
   (3) calcining in air the lightly pressed mixture of step (2) at 650° C. to 900° C. for 0.5 to 6 hours.

2. A process according to claim 1, wherein step (3) is carried out at 700° to 800° C. for 1 to 4 hours.

3. A process according to claim 1 wherein the mixture of step (1) consists essentially of:
   (a) 10 to 60 mole % cadmium oxide (CdO),
   (b) 10 to 45 mole % boron oxide ($B_2O_3$),
   (c) 0.3 to 1.0 mole % manganese oxide (MnO),
   (d) 0 to 10 mole % of an oxide selected from the group $K_2O$, CaO, MgO, BaO, SrO, NiO, CoO, $Cr_2O_3$, $TiO_2$, and $ZrO_2$,
   (e) 1.5 to 19.7 mole % sodium oxide ($Na_2O$),
   (f) 2.5 to 20 mole % aluminum oxide ($Al_2O_3$)
   (g) 5 to 40 mole % silica ($SiO_2$); and wherein (c), (e), (f) and (g) are in the form of a manganese loaded zeolite-A.

4. A process according to claim 1 wherein the mixture of step (1) consists essentially of:
   (a) 24 to 28 mole % cadmium oxide (CdO)
   (b) 25 to 29 mole % boron oxide ($B_2O_3$)
   (c) 0.4 to 0.8 mole % Manganese oxide (MnO)
   (d) 0 to 10 mole % of an additional oxide selected from the group $K_2O$, CaO, MgO, BaO, SrO, NiO, CoO, $Cr_2O_3$, $TiO_2$ and $ZrO_2$,
   (e) 9.4 to 12.7 mole % sodium oxide ($Na_2O$)
   (f) 10.2 to 13.1 mole % aluminum oxide ($Al_2O_3$)

(g) 20.4 to 26.2 mole % silica ($SiO_2$); wherein (c), (e), (f) and (g) are in the form of a manganese loaded zeolite-A.

5. A process according to claim 4, wherein (d) is 2 to 10 mole % calcium oxide, magnesium oxide, or zirconium oxide.

6. A process according to claim 1, wherein (d) is 2 to 10 mole % calcium oxide, magnesium oxide, or zirconium oxide.

7. A process for producing a luminescent material containing manganese activated cadmium borate comprising the steps of:
 (1) forming a mixture is comminuted form corresponding to the formulation of
  (a) 1 to 80 mole % cadmium oxide (CdO),
  (b) 1 to 50 mole % boron oxide ($B_2O_3$),
  (c) 0.2 to 1.3 mole % manganese oxide (MnO),
  (d) 0.1 to 22.5 mole % sodium oxide ($Na_2O$),
  (e) 0.3 to 23.8 mole % aluminum oxide ($Al_2O_3$),
  (f) 0.5 to 47.5 mole % silica ($SiO_2$), wherein materials (a), and (b) are compounds which are oxides or compounds which are converted into oxides under the calcining conditions employed in step (3) and materials (c), (d), (e) and (f) are in the form of a manganese loaded zeolite-A
 (2) lightly pressing the mixture of step (1); and
 (3) calcining in air the lightly pressed mixture of step (2), at 650° C. to 900° C. for 0.5 to 6 hours.

8. A process according to claim 7 wherein the mixture of step (1) consists essentially of:
 (a) 24 to 28 mole % cadmium oxide (CdO)
 (b) 25 to 29 mole % boron oxide ($B_2O_3$)
 (c) 0.4 to 0.8 mole % Manganese oxide (MnO)
 (d) 9.4 to 12.7 mole % sodium oxide ($Na_2O$)
 (e) 10.2 to 13.1 mole % aluminum oxide ($Al_2O_3$)
 (f) 20.4 to 26.2 mole % silica ($SiO_2$); wherein (c), (d), (e) and (f) are in the form of a manganese loaded zeolite-A.

* * * * *